US012561745B2

(12) United States Patent
Hecht

(10) Patent No.: US 12,561,745 B2
(45) Date of Patent: Feb. 24, 2026

(54) ARTIFICIAL INTELLIGENCE SYSTEMS AND METHODS FOR EFFICIENT USE OF ASSETS

(71) Applicant: Thomas Hecht, Wilbraham, MA (US)

(72) Inventor: Thomas Hecht, Wilbraham, MA (US)

( * ) Notice: Subject to any disclaimer, the term of this patent is extended or adjusted under 35 U.S.C. 154(b) by 0 days.

(21) Appl. No.: 19/051,264

(22) Filed: Feb. 12, 2025

(65) Prior Publication Data

US 2025/0182211 A1 Jun. 5, 2025

Related U.S. Application Data

(63) Continuation-in-part of application No. 18/216,329, filed on Jun. 29, 2023, now abandoned.

(51) Int. Cl.
*G06Q 40/06* (2012.01)
*G06N 3/04* (2023.01)
*G06N 3/063* (2023.01)

(52) U.S. Cl.
CPC .............. *G06Q 40/06* (2013.01); *G06N 3/04* (2013.01); *G06N 3/063* (2013.01)

(58) Field of Classification Search
CPC .......... G06Q 40/06; G06N 3/04; G06N 3/063; G06N 3/09; G06N 3/092; G06N 3/096; G06N 3/10
See application file for complete search history.

(56) References Cited

U.S. PATENT DOCUMENTS

| | | | | |
|---|---|---|---|---|
| 10,002,658 | B1 * | 6/2018 | Hokenmaier | .......... G06N 3/063 |
| 11,561,833 | B1 * | 1/2023 | Heaton | ............... G06F 9/45504 |
| 11,595,779 | B2 * | 2/2023 | Brady | .................... G06Q 50/40 |
| 2003/0212645 | A1 * | 11/2003 | Schaffer | ................. G06N 3/086 |
| | | | | 706/26 |
| 2010/0153282 | A1 * | 6/2010 | Graham | ................. G06Q 10/10 |
| | | | | 705/310 |

(Continued)

FOREIGN PATENT DOCUMENTS

| | | | | |
|---|---|---|---|---|
| WO | WO-2011139363 | A1 * | 11/2011 | ............. G06Q 40/08 |
| WO | WO-2019200466 | A1 * | 10/2019 | ........... H04L 9/3239 |

OTHER PUBLICATIONS

Leskovec, Jure, Anand Rajaraman, and Jeffrey David Ullman. "Mining of Massive Datasets." (2019). (Year: 2019).*

(Continued)

*Primary Examiner* — James H Miller

(74) *Attorney, Agent, or Firm* — Sam Pierce

(57) ABSTRACT

The present invention provides systems and methods for utilizing an application-specific integrated circuit (ASIC) for an artificial neural network connected to the memory, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein the array is configured to analyze said business sale transaction information trained on historical datasets relating to asset utilization, wherein the AI/ML categorization engine makes a prediction regarding the most efficient use(s) of an asset.

5 Claims, 1 Drawing Sheet

(56) References Cited

U.S. PATENT DOCUMENTS

| | | | | |
|---|---|---|---|---|
| 2012/0316911 A1* | 12/2012 | Schwarz | G06Q 10/10 | |
| | | | | 705/7.19 |
| 2015/0111591 A1* | 4/2015 | Hoffberg | G06Q 20/065 | |
| | | | | 455/452.1 |
| 2017/0076256 A1* | 3/2017 | Castel | G06Q 10/06311 | |
| 2017/0270408 A1* | 9/2017 | Shi | G06N 3/063 | |
| 2020/0258018 A1* | 8/2020 | Brady | G06Q 50/40 | |
| 2021/0125284 A1* | 4/2021 | Lard | G07F 9/006 | |
| 2021/0297807 A1* | 9/2021 | Brady | G07C 5/008 | |
| 2022/0084079 A1* | 3/2022 | Stewart | G06N 5/04 | |
| 2023/0214920 A1* | 7/2023 | Hecht | G06Q 40/06 | |
| | | | | 705/35 |
| 2023/0230182 A1* | 7/2023 | Burris | G06N 20/00 | |
| | | | | 705/313 |
| 2025/0147506 A1* | 5/2025 | Trivedi | G05D 1/0088 | |

OTHER PUBLICATIONS

The History of Asset Management Systems (Year: 2024).*
Engineering flexible machine learning systems by traversing functionally invariant paths (Year: 2021).*
Propy Whitepaper 2.0 (Year: 2021).*
Keyway raises $70M for sale-leaseback solution targeting SMBs (Year: 2022).*

* cited by examiner

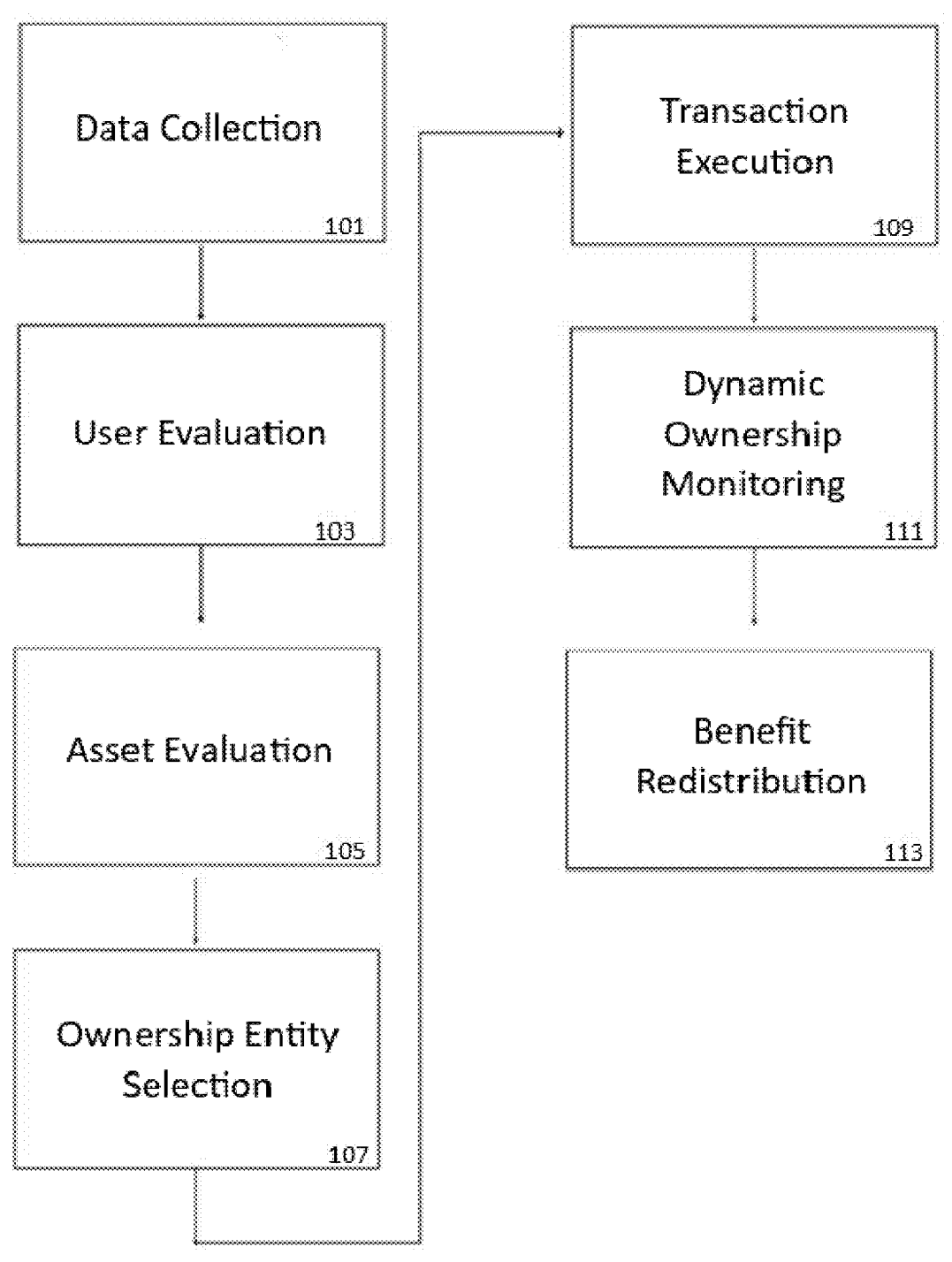

ARTIFICIAL INTELLIGENCE SYSTEMS AND METHODS FOR EFFICIENT USE OF ASSETS

BACKGROUND OF THE INVENTION

Field of Invention

The present invention relates to the field of asset management and economic optimization. The present disclosure teaches systems and methods of creating specialized asset ownership entities optimally structured to own assets, maximize economic benefits of ownership, and share at least some of the maximized benefits with users as at least incentive to the users to participate. Furthermore, the invention encompasses applications for both tangible assets, such as real property and vehicles, and intangible assets, such as financial assets like employer retirement account matches or employee stock purchase plans (ESPP). The invention promotes sustainability, efficiency, and conscious capitalism by enabling the redistribution of economic advantages to asset users in exchange for participation, ultimately optimizing collective economic benefits.

BRIEF SUMMARY OF THE INVENTION

The present invention provides systems and methods for utilizing an application-specific integrated circuit (ASIC) for an artificial neural network connected to the memory, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein the array is configured to analyze said business sale transaction information trained on historical datasets relating to asset utilization, wherein the AI/ML categorization engine makes a prediction regarding the most efficient use(s) of an asset.

The invention further provides for dynamic transitions of ownership during an asset's useful life to account for changes in economic, legal, and regulatory factors. By analyzing user needs, financial and credit records, and ownership entity capabilities, the system ensures optimal allocation of resources and maximized collective benefits. This framework promotes sustainability, conscious capitalism, and efficiency, while offering users economic benefits without the burdens of ownership.

BRIEF DESCRIPTION OF THE FIGURES

FIG. 1: Illustrates the system's process for optimizing asset ownership and use, beginning with the collection of user, asset, and ownership entity data (FIG. 1.101), evaluating users and assets for suitability (FIGS. 1.103 and 1.105), selecting or creating optimized ownership entities (FIG. 1.107), facilitating ownership transfer and usage agreements (FIG. 1.109), dynamically monitoring asset performance and ownership conditions (FIG. 1.111), and redistributing the economic benefits of optimized ownership back to users (FIG. 1.113).

DETAILED DESCRIPTION

The present invention pertains to systems and methods for decoupling asset ownership from asset use, thereby estab-lishing a framework designed to maximize collective economic benefit. By leveraging novel approaches to asset ownership, the invention enables the creation of specialized ownership entities optimized to derive maximum economic value from assets while simultaneously allowing users to access and enjoy the benefits of those assets. Ownership is shifted from users, who often experience inefficiencies due to financial, legal, or tax limitations, to entities structured to achieve economic efficiencies that are otherwise unavailable to traditional ownership models. This decoupling of ownership from usage allows the system to maximize economic utility for all stakeholders, including users, ownership entities, and society as a whole.

Ownership and usage are recognized as distinct economic concepts that need not be coupled. Historically, these concepts have been linked, with ownership conferring exclusive usage rights as well as financial, tax, and social benefits. However, the burdens associated with ownership—including maintenance costs, depreciation, and legal liabilities—often outweigh the benefits for many users. The present invention disrupts this traditional model by introducing systems and methods that allocate ownership to specialized entities better equipped to derive economic value, while allowing users to retain the benefits of usage without the burdens of ownership. The invention further introduces mechanisms for redistributing the economic value derived by ownership entities back to users as a form of incentive or compensation, ensuring equitable benefit sharing between owners and users.

Framework for Asset Optimization

The systems and methods described herein apply to a wide variety of assets, encompassing both tangible and intangible asset classes. Tangible assets include real property, vehicles, machinery, equipment, and other productive assets that require active management to optimize their value. For instance, vehicles that are underutilized by individual owners may generate greater economic value when managed by an optimized ownership entity that leases them to multiple users. Intangible assets include financial instruments such as employer-sponsored retirement accounts, employee stock purchase plans (ESPPs), and other structured financial programs. Additionally, digital assets such as software licenses, intellectual property, and non-fungible tokens (NFTs) fall within the scope of the invention.

In many cases, individuals and organizations fail to fully realize the economic potential of their assets due to inefficiencies in ownership and management. For example, an employee who neglects to participate fully in an employer's retirement matching program leaves significant economic gains unrealized. Similarly, an underutilized vehicle, stored in a garage for most of its lifecycle, represents a missed opportunity to extract value through shared or pooled usage. The present invention addresses such inefficiencies by facilitating the transfer of ownership to specialized entities that maximize asset utility through innovative legal, tax, and economic structures.

The system also recognizes that assets evolve over their lifecycle, necessitating dynamic ownership transitions. For example, during the early years of a vehicle's useful life, demand may be high, making it suitable for allocation to an entity focused on maximizing short-term rental or lease revenues. As the vehicle depreciates and enters its later years, it may transition to another entity optimized for managing residual value, such as a used vehicle market aggregator. Financial instruments, similarly, may be transferred between entities based on changes in market conditions, regulatory frameworks, or user needs.

3

Leveraging Advanced Computational Techniques

A cornerstone of the invention is its use of advanced computational methods, including machine learning algorithms, to evaluate and optimize asset ownership and usage. These algorithms enable the system to analyze a wide range of data inputs, including asset characteristics, user behavior, historical trends, and market conditions, to make informed decisions about ownership and allocation. The machine learning framework allows the system to dynamically adapt to changes in user demographics, economic conditions, and asset demand, ensuring continuous optimization.

Assets such as physical assets like real estate, vehicles, or machinery as well as intangible assets such as software code and non-fungible tokens can be analyzed by machine learning algorithms which are used to make a prediction or classification regarding the most efficient use of the assets. Based on some input data, which can be labeled or unlabeled, the algorithm will produce an estimate about a pattern in the data.

An error function evaluates the prediction of the model. If there are known examples, an error function can make a comparison to assess the accuracy of the model. A model optimization process then occurs. If the model can fit better to the data points in the training set, then weights are adjusted to reduce the discrepancy between the known example and the model estimate. The algorithm will repeat this "evaluate and optimize" process, updating weights autonomously until a threshold of accuracy has been met.

Supervised learning in particular uses a training set to teach models to yield the desired output. This training dataset includes inputs and correct outputs, which enables the model to learn over time. The algorithm measures its accuracy through the loss function, adjusting until the error has been sufficiently minimized.

After training, the machine learning categorization engine processes the sensor data using pre-trained models trained on datasets of other asset utilization data. It comprises an application-specific integrated circuit (ASIC) for an artificial neural network connected to the computer memory device, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein the array is configured to analyze said business sale transaction information trained on historical datasets relating to asset utilization, wherein the AI/ML categorization engine makes a prediction regarding the most efficient use(s) of an asset.

The system's ability to dynamically evaluate and optimize asset ownership and usage is enhanced by this robust computational foundation. For example, a machine learning algorithm may analyze historical data to identify underutilized assets within a specific geographic region and recommend their reallocation to entities capable of extracting greater value. Similarly, the algorithm may evaluate a user's financial data to determine whether they are better suited for a short-term usage arrangement or a long-term lease.

Integrated Components for Dynamic Asset Management

The invention achieves its objectives through the integration of several key components, each of which addresses a specific aspect of asset evaluation, acquisition, ownership, and management. These components operate in concert to ensure that assets are continuously optimized for maximum economic benefit.

4

1. Entity Creation Component

The entity creation component is responsible for forming new ownership entities tailored to the specific characteristics of the assets and users involved. These entities are structured to exploit legal, tax, and regulatory advantages that are unavailable to individual owners. For example, a nonprofit entity may be established to own and manage assets in a manner consistent with its charitable mission, while a for-profit corporation may be created to optimize returns for investors. Hybrid entities, combining elements of nonprofit and for-profit structures, may also be employed to achieve balanced economic and social objectives.

2. User Evaluation Component

The user evaluation component analyzes a wide range of user data, including financial records, credit history, income, usage patterns, and long-term goals. By identifying inefficiencies in a user's current asset ownership or usage, the system can recommend optimized arrangements. For instance, a user with a strong credit profile but limited cash flow may benefit from a leasing arrangement that provides access to a vehicle while freeing up capital for other purposes. Conversely, a user with high cash reserves may be better suited for a usage agreement that includes a deferred ownership option.

3. Asset Evaluation Component

This component evaluates the physical, economic, and legal characteristics of each asset. For tangible assets, this includes assessments of condition, depreciation, market value, and utility. For intangible assets, the evaluation focuses on accrual potential, regulatory constraints, and market demand. By aggregating these data points, the system determines the optimal ownership arrangement for each asset.

4. Asset Acquisition Component

The asset acquisition component facilitates the transfer of assets into the system. Assets may be acquired directly from users, purchased from third parties, or obtained from manufacturers. The system ensures that acquisitions are cost-effective and aligned with the overarching goal of maximizing collective economic benefit.

5. Transaction Component

The transaction component oversees the execution of agreements between users and ownership entities. These agreements define the terms of asset usage, ownership rights, and the redistribution of economic benefits. The component ensures that all transactions comply with relevant legal, tax, and regulatory frameworks.

6. Entity Evaluation Component

To ensure that ownership entities remain effective, the system continuously monitors their performance. If an entity is no longer optimized for its role, the system reallocates assets to a more suitable entity, ensuring uninterrupted optimization.

Pooling and Collective Ownership

In addition to one-to-one ownership arrangements, the invention supports pooling models in which multiple assets are collectively owned and dynamically allocated to users. For example, a fleet of vehicles may be managed by an ownership entity that maximizes their utilization by assigning them to users based on demand. This pooling approach reduces the overall cost of ownership while ensuring that assets are consistently utilized at their highest value.

Through its innovative systems and methods, the invention provides a comprehensive framework for optimizing asset ownership and usage. By leveraging specialized ownership entities, advanced computational techniques, and integrated system components, the invention ensures that all stakeholders—users, ownership entities, and society at large—benefit from enhanced economic outcomes, sustainability, and efficiency.

Pooling Models and Collaborative Ownership

The invention supports advanced pooling models, wherein multiple assets are collectively owned and dynamically allocated among users to maximize economic efficiency. For instance, a fleet of vehicles may be managed by an ownership entity that assigns vehicles to users based on real-time demand, reducing underutilization and ensuring that assets are consistently operating at their highest value. Similarly, real estate properties such as co-working spaces or residential buildings can be collectively owned and made available to users through flexible leasing or usage agreements. The pooling model provides several advantages, including risk mitigation for ownership entities, cost savings for users, and reduced environmental impact by minimizing waste and redundancy in asset allocation.

The governance of pooled assets may be facilitated through legal frameworks such as joint ownership agreements, trust structures, or cooperative models. Ownership entities may establish voting rights, profit-sharing mechanisms, and dispute resolution procedures to ensure the fair and transparent management of pooled assets. Furthermore, the system may enable users to acquire fractional ownership stakes in pooled assets, allowing individuals to participate in the economic benefits of ownership without bearing the full financial burden.

Dynamic Lifecycle Management of Assets

An essential aspect of the invention is its ability to dynamically manage assets throughout their lifecycle. The system continuously monitors assets to determine when ownership transitions are necessary to maximize economic value. For example, a piece of industrial equipment may initially be owned by an entity focused on maximizing operational output during the asset's peak performance years. As the equipment ages and maintenance costs increase, ownership may transition to an entity specializing in refurbishing and reselling used equipment. Similarly, intellectual property, such as patents or software licenses, may transition between entities based on changes in market demand, technological advancements, or regulatory conditions.

Machine learning algorithms play a critical role in lifecycle management, analyzing real-time data to identify trends, predict future performance, and recommend ownership transitions. By automating these processes, the system reduces human error, accelerates decision-making, and ensures that assets are always allocated to the entities best positioned to optimize their value.

Alignment with Sustainability Goals

The invention aligns with global sustainability goals by promoting the efficient use of resources and minimizing waste. By reallocating underutilized assets and extending their useful life through optimized ownership structures, the system reduces the environmental impact associated with asset production and disposal. For example, a car-sharing program managed under the system may reduce the need for individual vehicle ownership, thereby lowering emissions and reducing the consumption of raw materials. Similarly, the pooling of renewable energy assets, such as solar panels or wind turbines, can maximize their utility while supporting the transition to clean energy.

Ownership entities within the system may also be incentivized to pursue environmental, social, and governance (ESG) objectives. For instance, entities may reinvest a portion of their profits into sustainable initiatives, such as planting trees, funding clean water projects, or developing affordable housing. These initiatives not only contribute to societal well-being but also enhance the reputation and long-term viability of ownership entities within the system.

Applications for Public-Private Partnerships

The system is uniquely suited to managing assets in public-private partnerships (PPPs), where government entities and private organizations collaborate to develop and operate infrastructure, utilities, and other public goods. For example, a municipal government may partner with a private ownership entity to manage a fleet of public transit vehicles, ensuring that the vehicles are utilized efficiently while generating revenue to offset operating costs. Similarly, the system may facilitate the management of public housing projects, where ownership entities optimize economic returns while ensuring that housing remains accessible and affordable for residents.

The system's ability to navigate complex regulatory environments makes it particularly valuable for PPPs. Ownership entities can be structured to comply with government mandates, tax incentives, and reporting requirements while leveraging private sector expertise to drive innovation and efficiency.

Monetization and Securities Creation

Ownership entities within the system may also generate revenue through the creation of securities or other financial instruments backed by assets under their control. For example, a pool of real estate properties may be securitized into a real estate investment trust (REIT), allowing investors to participate in the economic benefits of the properties without directly owning them. Similarly, intangible assets such as intellectual property or digital content may be bundled into financial products that can be traded on secondary markets. These monetization strategies create new opportunities for ownership entities to generate value while expanding access to capital for users and investors.

Scalability and Adaptability of the System

The system is designed to scale seamlessly across geographies, asset classes, and user demographics. As the number of users and assets in the system grows, the underlying computational infrastructure can accommodate increased demand by leveraging cloud-based technologies, distributed databases, and advanced machine learning algorithms. Furthermore, the system is adaptable to changes in legal, tax, and regulatory frameworks, ensuring that ownership entities remain compliant while continuing to optimize economic outcomes. For example, the system may automatically adjust its asset allocation strategies in response to new tax incentives, environmental regulations, or market conditions.

By integrating advanced computational techniques, dynamic lifecycle management, and innovative ownership structures, the present invention provides a comprehensive framework for optimizing asset ownership and use. The system not only enhances economic efficiency but also promotes sustainability, equity, and social well-being. Through its ability to decouple ownership from usage, redistribute economic benefits, and align with global goals such as ESG principles, the invention represents a transformative approach to asset management that benefits all stakeholders-users, ownership entities, and society at large.

Below is an example of a high-level architecture and code implementation for a simplified version of the system, focusing on core functionalities:

1. Tech Stack

Frontend: React.js (for web app interface) or Flutter (for mobile apps)

Backend: Node.js (Express.js framework) or Python (Django/Flask)

Database: PostgreSQL (relational database) or MongoDB (NoSQL database)

Cloud Services: AWS or Google Cloud for hosting, storage, and scalability

Machine Learning: Python (for user evaluation and dynamic ownership optimization)

2. Backend Code

This code uses Node.js with Express.js and demonstrates basic APIs for key functionalities like creating users, assets, and ownership entities, evaluating users, and assigning assets to entities.

```
a. Backend: server.js
const express = require('express');
const app = express( );
const bodyParser = require('body-parser');
const { v4: uuidv4 } = require('uuid'); // For generating unique IDs
// Middleware
app.use(bodyParser.json( ));
// Mock Databases
let users = [ ];
let assets = [ ];
let ownershipEntities = [ ];
// Endpoints
// 1. Create a User
app.post('/users', (req, res) => {
    const { name, creditScore, income } = req.body;
    const userId = uuidv4( );
    const newUser = { id: userId, name, creditScore, income, assets: [ ] };
    users.push(newUser);
    res.status(201).json({ message: 'User created successfully', user: newUser });
});
// 2. Create an Asset
app.post('/assets', (req, res) => {
    const { name, type, value } = req.body;
    const assetId = uuidv4( );
    const newAsset = { id: assetId, name, type, value, currentOwner: null, users: [ ]
};
    assets.push(newAsset);
    res.status(201).json({ message: 'Asset created successfully', asset: newAsset });
});
// 3. Create an Ownership Entity
app.post('/ownership-entities', (req, res) => {
    const { name, structureType } = req.body;
    const entityId = uuidv4( );
    const newEntity = { id: entityId, name, structureType, assets: [ ], users: [ ] };
    ownershipEntities.push(newEntity);
    res.status(201).json({ message: 'Ownership entity created successfully', entity:
newEntity });
});
// 4. Assign Asset to Ownership Entity
app.post('/assign-asset', (req, res) => {
    const { entityId, assetId } = req.body;
    const entity = ownershipEntities.find((e) => e.id === entityId);
    const asset = assets.find((a) => a.id === assetId);
    if (!entity || !asset) {
        return res.status(404).json({ message: 'Entity or Asset not found' });
    }
    asset.currentOwner = entityId;
    entity.assets.push(assetId);
    res.status(200).json({ message: 'Asset assigned to entity successfully', entity,
asset });
});
// 5. Evaluate User for Asset Use
app.post('/evaluate-user', (req, res) => {
    const { userId, assetId } = req.body;
    const user = users.find((u) => u.id === userId);
    const asset = assets.find((a) => a.id === assetId);
    if (!user || !asset) {
        return res.status(404).json({ message: 'User or Asset not found' });
    }
    // Simple evaluation logic: Credit score above 650 and income > $50k
    if (user.creditScore >= 650 && user.income > 50000) {
        asset.users.push(userId);
        user.assets.push(assetId);
        res.status(200).json({ message: 'User is eligible for asset use', user, asset });
    } else {
        res.status(400).json({ message: 'User is not eligible for asset use' });
    }
});
```

-continued

```
// 6. Get System Summary
app.get('/summary', (req, res) => {
    res.status(200).json({
        users,
        assets,
        ownershipEntities,
    });
});
// Start the Server
const PORT = 3000;
app.listen(PORT, ( ) => {
    console.log(`Server running on http://localhost:${PORT}`);
});
4. Frontend Interface (React.js)
The frontend would connect to the above backend through API endpoints. For
example, a React.js component to create a user might look like this:
import React, { useState } from 'react';
function CreateUser( ) {
    const [name, setName] = useState('');
    const [creditScore, setCreditScore] = useState('');
    const [income, setIncome] = useState('');
    const [response, setResponse] = useState(null);
    const handleSubmit = async (e) => {
        e.preventDefault( );
        const userData = { name, creditScore: parseInt(creditScore), income:
parseFloat(income) };
        try {
            const res = await fetch('http://localhost:3000/users', {
                method: 'POST',
                headers: { 'Content-Type': 'application/json' },
                body: JSON.stringify(userData),
            });
            const data = await res.json( );
            setResponse(data);
        } catch (err) {
            console.error('Error creating user:', err);
        }
    };
    return (
        <div>
            <h2>Create User</h2>
            <form onSubmit={handleSubmit}>
                <input type="text" placeholder="Name" value={name} onChange={(e) =>
setName(e.target.value)} />
                <input type="number" placeholder="Credit Score" value={creditScore}
onChange={(e) => setCreditScore(e.target.value)} />
                <input type="number" placeholder="Income" value={income}
onChange={(e) => setIncome(e.target.value)} />
                <button type="submit">Create User</button>
            </form>
            {response && <pre>{JSON.stringify(response, null, 2)}</pre>}
        </div>
    );
}
``` export default CreateUser;

Memory Optimization in Distributed Computing Environments

The invention employs advanced memory optimization techniques to ensure efficient operation of its machine learning algorithms and neural network systems across distributed data centers. Given the large-scale computational requirements of analyzing user data, asset characteristics, and market trends, the system leverages a distributed architecture to maximize resource utilization while minimizing latency and operational costs. This architecture ensures that computer memory, storage, and processing power are allocated dynamically and efficiently across multiple nodes.

1. Memory Management for Neural Networks

The system's artificial neural network (ANN) processes high-dimensional datasets, which can place significant demands on memory resources. To address these challenges, the invention incorporates several key memory management techniques:

Model Parallelism: Large neural network models are split across multiple data center nodes, allowing different layers or components of the network to be processed in parallel. For example, the input layer and hidden layers may reside on separate nodes, with memory usage balanced dynamically to prevent bottlenecks. The present invention is configured to reallocate data storage locations among the plurality of computer memory storage devices and transfer stored data across the plurality of geospatial locations.

Gradient Checkpointing: During training, the system selectively stores key intermediate results (checkpoints) instead of retaining all activation states in memory. This reduces memory usage while still enabling efficient backpropagation for weight updates.

Memory-Aware Neural Network Design: The network architecture is optimized to minimize memory overhead by using lightweight activation functions and reducing redundant computations. For instance, sparse matrix representations may be used to compress model parameters without sacrificing accuracy.

2. Distributed Data Storage and Access

To support the vast amounts of data required for training and inference, the system employs distributed storage solutions across data centers. These solutions ensure that memory and storage are utilized efficiently, even as data volumes scale. Key features include:

Data Sharding: The dataset is divided into smaller partitions (shards) that are distributed across multiple storage nodes. Each node stores only a portion of the data, reducing memory requirements while enabling parallel data access.

Caching and Prefetching: Frequently accessed data is cached in high-speed memory, such as RAM, while less critical data is stored on slower but more cost-effective media, such as SSDs or HDDs. Prefetching techniques anticipate future data access patterns and load data into memory proactively.

Compression Algorithms: To minimize storage and memory usage, the system applies compression techniques such as columnar storage formats for tabular data and quantization for neural network weights. These methods significantly reduce memory overhead without degrading performance.

3. Memory-Aware Scheduling in Data Centers

The system incorporates a memory-aware scheduling mechanism to dynamically allocate memory resources across data centers based on workload demands. Key features include:

Dynamic Resource Allocation: The system monitors real-time memory usage and reallocates resources across data centers as needed to prevent memory shortages or overprovisioning.

Priority-Based Scheduling: Memory-intensive tasks, such as training deep neural networks, are assigned priority access to high-performance memory resources, while less intensive tasks are executed on standard nodes.

Elastic Scaling: During periods of high demand, the system automatically scales up memory resources by provisioning additional virtual machines or containers. Conversely, memory usage is scaled down during off-peak periods to reduce costs.

4. Multi-Tenancy and Memory Isolation

The system supports multi-tenancy, allowing multiple ownership entities and users to share the same underlying computational infrastructure. To ensure efficient and secure memory usage in a multi-tenant environment:

Memory Isolation: Each tenant operates within a virtualized environment with dedicated memory and storage resources. This prevents memory contention and ensures that sensitive data remains secure.

Shared Resource Pools: Common data and models are stored in shared memory pools accessible to all tenants, reducing duplication and improving overall memory efficiency.

5. Cloud-Based Implementation for Scalability

The system is designed to operate within cloud-based data center environments, which provide scalable memory and storage resources. Key benefits of this approach include:

On-Demand Resource Provisioning: Memory and storage can be provisioned dynamically based on workload requirements, ensuring that the system operates efficiently under varying conditions.

Geographically Distributed Data Centers: By distributing data and computation across multiple geographic regions, the system reduces latency and improves memory access times for users in different locations.

Serverless Computing Models: In certain applications, the system leverages serverless computing architectures to execute tasks without the need for dedicated servers. This approach minimizes memory wastage by allocating resources only when tasks are actively running.

6. Environmental and Cost Efficiency

Efficient memory use across data centers not only improves performance but also reduces environmental impact and operational costs. By minimizing memory overhead and dynamically reallocating resources, the system:

Reduces energy consumption associated with data center operations.

Optimizes hardware utilization, extending the lifecycle of physical memory and storage components.

Lowers financial costs for ownership entities and users, enabling the system to operate sustainably at scale.

Machine Learning Architecture and Neural Network Implementation

The invention relies on sophisticated machine learning algorithms and neural network architectures to dynamically optimize asset ownership, usage, and allocation. These computational models form the core of the system's ability to analyze complex datasets, predict outcomes, and adapt to changing conditions in real time. The implementation of these algorithms enables the system to process vast amounts of user, asset, and market data to deliver optimized results.

1. Neural Network Design

The invention employs an artificial neural network (ANN) specifically designed for analyzing asset-related data and predicting optimal ownership and usage patterns. The neural network comprises multiple layers of interconnected nodes, where each layer performs a specific computational function. These layers include:

Input Layer: This layer receives raw data about users, assets, and ownership entities. Data inputs may include asset characteristics (e.g., type, value, lifecycle stage), user financial information (e.g., credit score, income, transaction history), and market trends (e.g., demand forecasts, depreciation rates).

Hidden Layers: These intermediate layers contain numerous neurons, each performing weighted calculations to identify patterns, correlations, and relationships within the input data. The hidden layers use activation functions such as ReLU (Rectified Linear Unit) or sigmoid functions to determine non-linear relationships critical for complex decision-making.

Output Layer: The final layer produces actionable outputs, such as recommendations for ownership transitions, optimized usage agreements, or dynamic pricing strategies.

The system's neural network is designed to handle high-dimensional data, meaning it can simultaneously process and analyze multiple variables, such as asset depreciation rates, user behavior patterns, and tax implications of ownership. The neural network's ability to identify patterns and relationships that are not immediately apparent to human operators enables the system to generate highly accurate and efficient recommendations.

2. Training the Neural Network

The neural network is trained on historical datasets that include real-world examples of asset usage, ownership structures, and economic outcomes. During the training process:

The system uses supervised learning, where labeled datasets containing known inputs and desired outputs are fed into the network.

The neural network adjusts its internal weights using a backpropagation algorithm, which minimizes the difference between the network's predictions and the actual outcomes (as measured by a loss function, such as mean squared error).

The system iteratively refines its predictions until the error rate falls below a predefined threshold, ensuring that the network can make accurate predictions on new, unseen data.

For example, the system may be trained on datasets of vehicle usage patterns, including how different ownership models (e.g., leasing, rental, or direct ownership) affect economic outcomes. By analyzing this data, the neural network learns to recommend ownership structures that maximize collective economic benefit while minimizing user costs.

3. Reinforcement Learning for Dynamic Optimization

In addition to supervised learning, the system employs reinforcement learning techniques to optimize decision-making in real time. In this approach, the system interacts with its environment (e.g., user behavior, market conditions) and receives feedback in the form of rewards or penalties. Based on this feedback, the system refines its strategies to maximize long-term benefits. For instance:

The system may recommend transitioning an underutilized asset to a pooled ownership model. If this transition results in increased utilization and economic returns, the system receives positive reinforcement and adjusts its future recommendations accordingly.

The neural network to learn even after it has been deployed. The term "ouroboros", common in many cultural contexts and depicted by a snake eating its own tail. It's an emblem representing the concept of self-renewal. A circular symbol that depicts a snake or dragon devouring its own tail is used especially to represent the eternal cycle of destruction and rebirth. The present invention incorporates the concept of ouroboros. After making initial predictions, classifications, analysis, and the like, the present invention enables neural networks to be continuously updated with new data that they are able to learn from without having to start from scratch. The algorithm, called a functionally invariant path (FIP) algorithm, has wide-ranging applications. The FIP algorithm uses a mathematical technique called differential geometry. The framework allows a neural network to be modified without losing previously encoded information. Using differential geometry, the present invention constructs paths through weight space that maintain the functional performance of a neural network while adjusting network weights to flow along a secondary goal. The secondary goal can be general, so that the framework can be applied to train networks on new classification tasks, sparsify networks, and mitigate adversarial fragility. Network sparsification is used to create smaller, faster, and more energy-efficient neural networks while maintaining accuracy.

Sparsification techniques can be broadly categorized into several key methods, each with its unique approach to compressing and optimizing neural networks:

Quantization

Quantization reduces the precision of weights and activations in a neural network, for example, from 32-bit floating-point numbers to 8-bit integers. Quantization can be applied to weights, activations, or both and can be done statically (before deployment) or dynamically (at runtime).

It decreases model size and memory usage, often leading to faster inference, particularly with specialized hardware support for low-precision arithmetic.

Pruning

Pruning eliminates redundant or less important connections within a model. Pruning can be done in either a structured or unstructured manner, where structured pruning changes the model's shape, and unstructured pruning keeps the shape intact while introducing zeros in the weights (sparsity). This results in a smaller model and faster inference due to reduced compute provided the engine/hardware supports sparse computation.

Knowledge Distillation

Distillation generally trains a smaller or more compressed "student" model to mimic the behavior of a larger, unoptimized "teacher" model. It enables the creation of more compressed models that are easier to deploy and execute while leveraging the knowledge and performance of the larger model to maintain accuracy. Distillation is further broken down into granularity levels, such as model-level, layer-level, and instance-level distillation.

Low Rank Approximation

Low-rank approximations (LoRA), also known as matrix factorization, matrix decomposition, or tensor decomposition, reduce the rank of the weight matrices in a neural network, effectively compressing the model. This technique is based on the observation that the weight matrices of neural networks are often low-rank, meaning they can be approximated by a product of two smaller matrices. It can be particularly effective for compressing a model's large, fully connected layers. It's also known to be used in conjunction with other compression techniques, such as quantization (QLoRA), to enable faster fine-tuning.

Conditional Computation

Conditional computation selectively activates only parts of a model based on the input data, leading to dynamic sparsity. This can be achieved through techniques such as gating, where a gating network decides which parts of the model to execute, or through adaptive computation, where the model learns to skip or reduce computation based on the input, such as Mixture of Experts (MoE) techniques. Conditional computation can significantly speed up inference time, especially for models with large, redundant, or unnecessary computations.

Regularization

Regularization methods such as L1 and L2 can be used to encourage sparsity in a neural network's weights. Adding a regularization term to the loss function incentivizes the model to reduce overfitting and learn simpler representations, which can lead to sparser models. Regularization can be used with other techniques, such as pruning, to further enhance the sparsity of a model.

Weight Sharing

Weight sharing involves sharing the weights of a neural network across different parts of the model, effectively reducing the number of unique weights and thereby reducing the model size. This can be done by clustering similar weights and sharing the same weight value across multiple connections. Weight sharing can be particularly effective for reducing a model's memory footprint, especially when combined with other compression techniques.

Architecture Search

Techniques such as neural architecture search (NAS) can automatically discover more efficient and compact neural network architectures. By searching over a large space of possible architectures, NAS can identify smaller, faster, and more accurate models than hand-designed architectures.

NAS can be used to optimize existing models or discover entirely new architectures tailored to specific tasks or constraints.

Compound Sparsification

Compound sparsification combines multiple techniques to achieve even more significant compression and optimization. By leveraging the strengths of different methods, compound sparsification can create smaller, faster, and more energy-efficient models than those produced by individual techniques. For example, pruning can be combined with quantization and distillation to create highly compressed models that retain high accuracy.

An error function evaluates the prediction of the model. If there are known examples, an error function can make a comparison to assess the accuracy of the model. A model optimization process then occurs. If the model can fit better to the data points in the training set, then weights are adjusted to reduce the discrepancy between the known example and the model estimate. The algorithm will repeat this "evaluate and optimize" process, updating weights autonomously until a threshold of accuracy has been met.

Supervised learning in particular uses a training set to teach models to yield the desired output. This training dataset includes inputs and correct outputs, which enables the model to learn over time. The algorithm measures its accuracy through the loss function, adjusting until the error has been sufficiently minimized.

4. Specialized ASIC for Neural Networks

The neural network is implemented on an application-specific integrated circuit (ASIC), which is optimized for high-performance machine learning workloads. The ASIC contains specialized hardware components, including:

Neurons: Each neuron in the ASIC represents a node in the neural network and performs mathematical operations such as weighted summation and activation.

Synaptic Circuits: These circuits store the synaptic weights that represent the strength of connections between neurons. The weights are updated during the training process to improve the network's accuracy.

Parallel Processing Units: The ASIC is designed to perform parallel computations, enabling the network to process large datasets efficiently and reduce latency in generating predictions.

The use of an ASIC ensures that the system can handle the computational demands of real-time asset evaluation and decision-making. For example, the ASIC enables the system to analyze thousands of assets and users simultaneously, identifying optimal ownership structures and usage patterns within seconds.

5. Data Sources for Machine Learning

The effectiveness of the system's machine learning models depends on the quality and diversity of the data used for training and analysis. The system integrates data from multiple sources, including:

User Data: Financial information, credit scores, asset usage history, and preferences.

Asset Data: Lifecycle information, depreciation rates, maintenance records, and market values.

Market Data: Economic trends, demand forecasts, and regulatory changes.

Ownership Entity Data: Legal structures, tax advantages, and historical performance metrics.

By aggregating and analyzing these datasets, the system generates insights that drive efficient asset allocation and ownership decisions.

6. Predictive Analytics and Future Demand Forecasting

The system incorporates predictive analytics to forecast future user demand and asset performance. These forecasts enable the system to proactively reallocate ownership or usage rights before inefficiencies arise. For example:

The system may predict that demand for a specific type of asset, such as electric vehicles, will increase due to regulatory incentives. In response, the system allocates more resources to acquiring and managing such assets, ensuring that users have access when demand peaks.

7. Ensuring Privacy and Security in Machine Learning

Given the sensitive nature of the data used by the system, robust privacy and security measures are implemented to protect user and asset information. These measures include:

Data Anonymization: Personally identifiable information (PII) is removed or encrypted to ensure that user data cannot be traced back to specific individuals.

Secure Data Storage: All data is stored in encrypted databases with access controls to prevent unauthorized access.

Ethical AI Practices: The system is designed to comply with ethical AI principles, ensuring that recommendations are fair, transparent, and unbiased.

DETAILED DESCRIPTION OF FIGURES

FIG. 1.101: Data Collection—In this step, the system collects information about users, assets, and ownership entities. The user data includes financial and tax information, such as income, credit score, and usage preferences. Asset data includes the asset type (e.g., tangible or intangible), its value, lifecycle stage, and current ownership. The system also references a database of ownership entities, capturing their structural, legal, tax, and financial characteristics. This step ensures that the system has sufficient inputs to evaluate and optimize economic benefits associated with asset ownership and use.

FIG. 1.103: User Evaluation—The system evaluates the collected user data to determine the suitability of the user for participation in an asset transaction. The evaluation process considers factors such as the user's creditworthiness, ability to pay, and intended use of the asset. The system identifies inefficiencies in the user's current ownership or planned use of the asset and highlights areas where optimized ownership arrangements could yield greater economic benefits for the user. For example, users with limited tax advantages may benefit from having the asset owned by an entity structured to realize those benefits on their behalf.

FIG. 1.105: Asset Evaluation—The system evaluates the asset to determine its potential for optimized economic performance under different ownership structures. This includes analyzing the asset's type, value, legal characteristics, and lifecycle stage. For instance, assets with high economic potential but poor utilization by the user-such as underutilized real estate or vehicles—are flagged for transfer to an ownership entity capable of extracting greater economic value. The system also assesses how ownership transitions may impact the asset's overall lifecycle and market demand.

FIG. 1.107: Ownership Entity Selection-Using insights from the user and asset evaluations, the system selects a specialized ownership entity from its database. The selection process matches the asset to an entity with the legal, tax, and financial structure optimized for maximizing economic benefit. If no suitable entity exists, the system creates a new ownership entity tailored to the asset's specific needs. Ownership entities may include for-profit corporations, nonprofits, or hybrid structures designed to balance economic and social objectives.

FIG. 1.109: Transaction Execution—The system facilitates the transfer of ownership of the asset to the selected entity while simultaneously granting usage rights to the user. This transaction is structured as a lease, rental, or long-term usage agreement. The terms of the transaction specify the portion of economic benefits that will be redistributed to the user. The system ensures compliance with legal, tax, and accounting regulations, enabling seamless execution of the agreement between the user and the ownership entity.

FIG. 1.111: Dynamic Ownership Monitoring—The system monitors the asset, ownership entity, and user over time to ensure that the transaction continues to yield maximum economic benefits. Changes in asset value, market conditions, or user needs may trigger a reassessment of the ownership structure. If necessary, the system dynamically reallocates ownership of the asset to a different entity better suited to manage the asset under evolving conditions. This monitoring ensures continuous optimization throughout the asset's lifecycle.

FIG. 1.113: Benefit Redistribution—The system redistributes a portion of the economic benefits generated by the ownership entity back to the user. This redistribution may take the form of reduced usage fees, dividends, or other financial incentives. By sharing the benefits of optimized ownership, the system incentivizes user participation while achieving superior economic outcomes for all stakeholders. Additionally, surplus benefits may be reinvested into asset management or pooled into collective funds to support broader sustainability initiatives.

What is claimed is:

1. A system for allocating asset ownership for maximized collective economic benefit, the system comprising:

a. at least one computer system comprising a processor and a memory storing executable instructions, wherein the processor executes the instructions to:

i. receive information about a user and an asset used or to be used by the user;

ii. store neural-network weights as a 32-bit floating-point variable;

iii. store neural-network activations as a 32-bit floating-point variable;

iv. statically quantize neural-network weights and neural-network activations as 8-bit integers, wherein the neural-network weights are quantized to reduce storage footprint;

v. ingest asset-utilization transaction data containing historical sale, lease, usage and user-profile records for the user-asset pair; and vi. retrieve supplemental historical datasets of economic outcomes and user demographics;

vii. utilize an application-specific integrated circuit (ASIC) for an artificial neural network connected to the memory, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein at least one hidden input intermediate layer(s) contains a plurality of neurons, each performing weighted calculations to identify patterns, correlations, and relationships within the input data, wherein the hidden layer(s) uses activation functions comprising ReLU (Rectified Linear Unit) and sigmoid functions to determine non-linear relationships; a plurality of synaptic circuits, each synaptic circuit storing a synaptic weight and coupling at least two neurons; and circuitry operable to execute a functionally invariant path (FIP) algorithm that updates network weights along differential-geometry paths so as to preserve learned behavior while increasing sparsity wherein the array is configured to analyze said business sale transaction information, asset usage, ownership structures, and economic outcomes, trained on historical datasets including a parameter for each of business sale transaction information, asset usage, ownership structures, and economic outcomes, wherein the AI/ML categorization engine makes a prediction regarding the most efficient use(s) of an asset;

viii. wherein during the training process the ASIC uses supervised learning, where labeled datasets containing known inputs and desired outputs are fed into the network; the neural network adjusts its internal weights using a backpropagation algorithm, which minimizes the difference between the network's predictions and the actual outcomes as measured by a mean squared error loss function and the ASIC iteratively refines its predictions until the error rate falls below a predefined threshold, ensuring that the network can make accurate predictions on new, unseen data;

ix. wherein the ASIC is further configured to:

X. execute a artificial intelligence machine learning categorization engine on the asset-utilization transaction data and output a predicted most-efficient-use vector for the asset;

xi. compare the ASIC output to the user's declared or observed usage pattern and flag in the data structure a projected differential meeting or exceeding a predefined threshold ownership inefficiency;

xii. issue a query to an ownership-entity database and return a ranked candidate list of specialized entities;

xiii. compute the maximum function output value of expected collective economic benefit across the candidate list and select the top-ranked entity;

xiv. encode a parameter for a transaction execution that transfers legal title to the selected entity while preserving usage rights for the user, wherein encoding the transfer and preservation of usage rights comprises: generating, in memory, a conveyance record designating the selected ownership entity as owner of the asset and a usage-agreement record granting the user possession or access under a lease, rental, or long-term usage agreement; executing the conveyance and usage agreement; storing the executed records in a database of assets, ownership entities, and users; and calculating and storing a benefit-sharing parameter to be redistributed to the user; and xv. wherein the memory further stores instructions that cause the system to:

xvi. migrate dataset shards between distributed memory devices in different geospatial data centers whenever a latency-or-cost heuristic is met to sustain parallel low-latency access, wherein migrating dataset shards between geospatial data centers comprises caching frequently accessed data and prefetching anticipated data to reduce access latency;

xvii. repeat, using the ASIC, an evaluate and optimize process to detect that re-titling of an asset would deliver an improvement above a set threshold and invoke another title-transfer routine that assigns the asset to a newly selected entity without interrupting user access;

xviii. apply the FIP algorithm to newly accumulated asset-utilization transaction data so as to refine prediction accuracy while preserving prior knowledge; and xix. dispatch an electronic alert to the user confirming continuity of usage following an ownership reassignment.

2. The system of claim 1, wherein assets stored in asset data comprise:

a. A plurality of computer memory storage devices; and b. Location data containing a plurality of respective geospatial locations associated with the respective computer memory storage devices is stored in asset data.

3. The system of claim 2, wherein the processor further executes the instructions to:

a. Reallocate data storage locations among the plurality of computer memory storage devices; and b. Transfer stored data across the plurality of geospatial locations.

4. The system of claim 3, wherein the processor further executes the instructions to a. utilize an application-specific integrated circuit (ASIC) for an artificial neural network connected to the memory, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein the array is configured to analyze one or more benefits associated with parallel data access and provide an set of output parameters dictating parallel data access pathways; and b. implement parallel access to stored data based on the access pathways.

5. The system of claim 1, wherein the processor further executes the instructions to:

a. Implement an functionally invariant path (FIP) algorithm using differential geometry to allow the ASIC to be modified without losing previously encoded information by constructing paths through weight space that maintain the functional performance of a neural network while adjusting network weights to flow along a secondary goal of maximizing network sparsification.

\*   \*   \*   \*   \*